United States Patent [19]

Maxner et al.

[11] 4,422,583

[45] Dec. 27, 1983

[54] WIRE FEEDER

[75] Inventors: Richard B. Maxner; Vitaly Bandura, both of Danvers, Mass.

[73] Assignee: USM Corporation, Farmington, Conn.

[21] Appl. No.: 330,265

[22] Filed: Dec. 14, 1981

[51] Int. Cl.³ .................. B65H 59/00; B65H 59/04; B65H 51/20; B65H 59/38

[52] U.S. Cl. .................. 242/45; 226/43; 226/44; 226/115; 226/118; 242/156

[58] Field of Search .......... 226/37, 42, 43, 45, 226/115, 118, 44, 119; 242/45, 75.4, 156, 156.2

[56] References Cited

U.S. PATENT DOCUMENTS

| | | | |
|---|---|---|---|
| 1,673,521 | 6/1928 | Maas | 226/43 |
| 2,227,387 | 12/1940 | Borton | 226/43 |
| 2,314,070 | 3/1943 | Bogoslowsky | 226/43 X |
| 2,828,455 | 3/1958 | Kraay et al. | 226/43 X |
| 3,049,308 | 8/1962 | Lang | 226/43 X |
| 3,088,642 | 5/1963 | Kingsley | 226/43 |
| 3,225,989 | 12/1965 | Stine | 226/37 X |
| 3,353,730 | 11/1967 | Lang | 226/43 |
| 3,485,426 | 12/1969 | Apicella | 226/43 X |
| 4,029,247 | 6/1977 | Sakariason | 226/43 |
| 4,364,503 | 12/1982 | Ivary et al. | 226/45 |

*Primary Examiner*—Stanley N. Gilreath
*Attorney, Agent, or Firm*—Alan N. McCartney

[57] ABSTRACT

A wire feed control device having driven rolls to pull wire from a reel type wire source, the driven rolls pass the wire through a housing, with the wire coacting with a control to the roller drive so that as the wire is accumulated in the housing, the control is operated terminating the drive to the rollers until wire is removed from the housing. The wire sources also has dampening means to inhibit rotation of the reel of wire.

3 Claims, 6 Drawing Figures

WIRE FEEDER

BACKGROUND OF THE INVENTION

This invention relates to devices that automatically feed wire at a constant pressure to a cut-off mechanism that consistently cuts an exact predetermined length of wire.

In mechanisms that remove taped individual electrical components from a reel in a sequential fashion for retaping of the components in a desired sequence for ultimate assembly to a circuit board, one of desired components that is often placed in the sequence is a jumper wire. Illustrations of machines of this type are shown in Woodman U.S. Pat. No. 4,119,206 and Romeo U.S. Pat. No. 3,669,309. These machines are software controlled and contain a plurality of taped electrical components that are sequentially removed from the tape, placed on a conveyor and subsequently retaped in the desired sequence for insertion into a printed circuit board.

In this assembly operation the machine will also carry a large roll of blank wire (called jumper wire) which will in the machine operation be supplied thru a feed roller mechanism to a cutter that cuts off a desired predetermined length of the jumper wire and places it on the conveyor for retaping in the proper sequence with the other electrical components. Such a taped jumper wire is illustrated in U.S. Pat. No. 3,971,193.

These reels of jumper wire are carried on the machine at a given station that has a spring biased idler pulley around which the wire passes, the wire then passes through straightening rollers and through driven feed rollers that are pulling the wire from the reel. After passing through the feed rollers, the wire is cut-off to a predetermined length and deposited on the sequencer conveyor at the desired time in the machine operation determined by the software controls. In this type of conventional wire feed, the feed rolls are driven a given revolution to supply a given length of wire to the cutter.

In this arrangement, because the wire is being pulled from the reel, the reel has a tendency to build up rotational inertia which varies the wire feed pressure to the feed rolls making it difficult for the feed rolls to supply during their feeding rotation a given exact length of wire to the cutter. Thus, it is desirable to develop a wire feeding mechanism wherein the action of the reel of wire is isolated from the feed rolls controlling the cut-off length of the wire. (This invention is illustrated in the environment of a component sequencing machine, however, the basic mechanism can be utilized in any machine in which a given exacting length of wire is desired—such as a staple forming machine. The invention is applicable to any mechanism wherein wire is removed from a large reel of wire and transferred to a cutter for consistently cutting exact lengths of the wire—wherein the action of a large reel of wire is isolated from the cutting mechanism so that it can supply consistent lengths of wire to be cut.)

SUMMARY OF THE INVENTION

It is an object of this invention to provide a wire feed control device which isolates the action of the reel of wire from a cut-off mechanism so that a consistent length of wire can be obtained.

It is another object of this invention to provide driven feed rolls for removing wire from a reel, the rolls passing the wire to a means controlling the operation of the feed rolls depending upon the amount of wire supplied by the feed rolls.

It is a further object of this invention to provide a guide housing receiving wire from driven feed rolls that contains a wire contact member actuating a switch which ceases operation of the drive to the feed rolls when a predetermined amount of wire is present in the housing. Further, in this combination, it is also desirable to provide the reel of wire with a dampener which resists a given amount of rotation of the reel of wire to limit the rotational inertia of the reel of wire as it is rotated during removal of the wire.

DESCRIPTION OF THE DRAWINGS

These and other objects will become apparent upon a reading of the accompanying detailed description in connection with the drawings which illustrate.

DESCRIPTION OF THE PREFERRED EMBODIMENT

Figure 1:
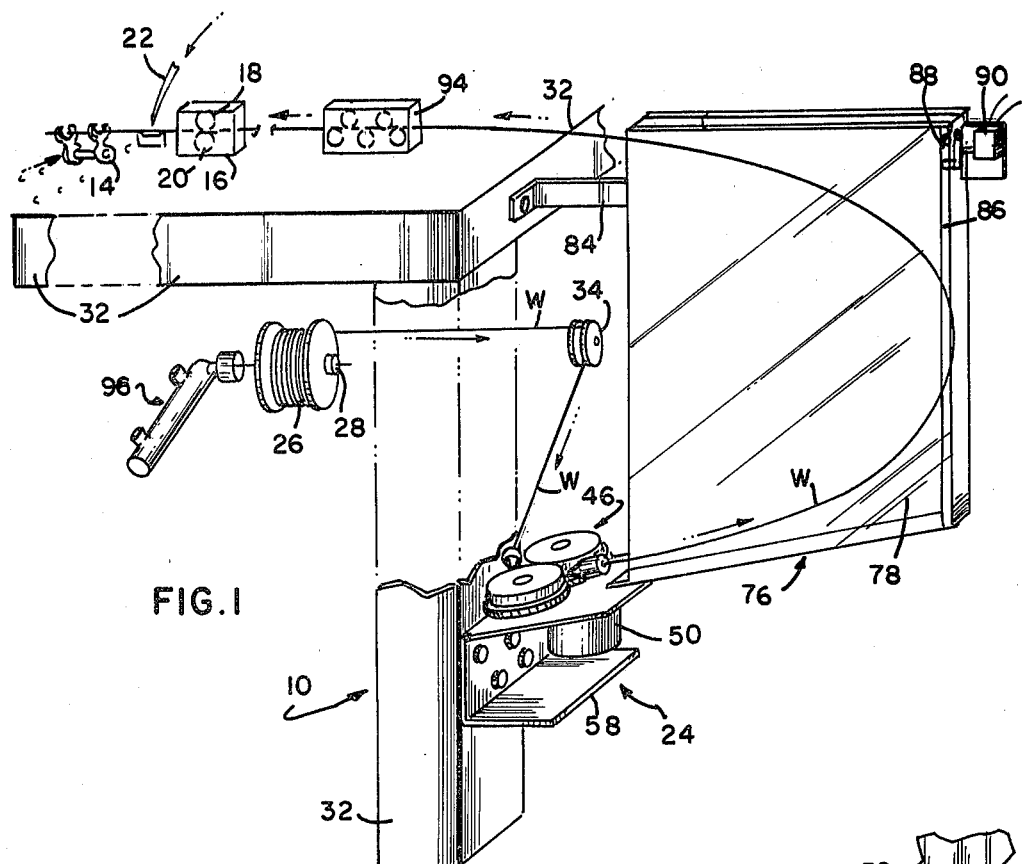
FIG. 1 is a diagrammatic perspective view of the wire feed mechanism of this invention.
Figure 2:
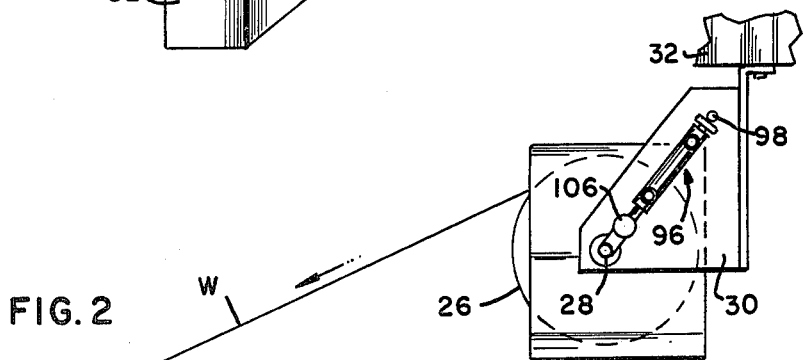
FIG. 2 is a side elevational view of the reel with the dampener and idler pulley being illustrated.
Figure 2:
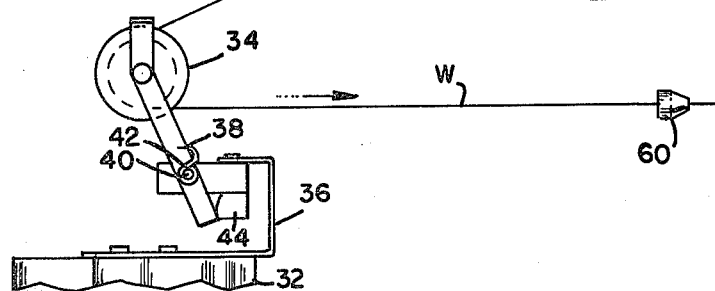

Attention is now directed to FIG. 1 which illustrates the wire feed mechanism 10 in the environment of feeding wire (W) to a cut-off mechanism 12 which places a predetermined length of jumper wire on the conveyor 14 of a component sequencing machine. This machine can be of the type illustrated in Woodman U.S. Pat. No. 4,119,206. Although this invention is illustrated in the environment of supplying wire to a component sequencing machine, this novel wire feeder can be used in any application where a consistent length of wire is desired.

The wire length control rolls 16 are conventional and comprise a drive roll 18 and a driven roll 20 between which the wire (W) is frictionally held. Thus a given rotation of these rollers will present a given length of wire—after which the cutter 22 is activated to cut-off the predetermined length of wire.

In combination with the conventional wire length feed rolls is the wire feed mechanism 24 which isolates the action of the wire removed from the reel 26 and presents the wire to the length cutting feed rolls under constant pressure so that a consistent length of wire can be cut. Further, this mechanism assures that only a certain amount of wire is unwound from the reel at a given time so that the unwound wire is controlled and not allowed to gather in an unwieldy fashion.

The reel of wire 26 is carried on a shaft 28 supported on flanges 30 secured to a portion of the machine frame 32. The wire (W) thus passes over a spring biased idler pulley 34 carried on a bracket 36 attached to the machine frame. A pair of arms 38 are pivotally carried on a shaft 40 carried on the bracket 36. A spring 42 surrounding shaft 40 and secured to arms 38 biases the arms 38 toward a stop 44 on the bracket 36 to load the idler pulley away from the reel to take-up any slack in the wire.

The wire passes from the idler pulley to the feed mechanism 46 which pulls the wire off the reel. This feed mechanism comprises a pair of rollers biased toward one another and having gripping surfaces between which the wire passes so that as these rollers rotate, the wire is unwound from the reel. A drive roller 48 is driven by a motor 50 and has gear teeth 54 meshed with teeth 56 on driven roller 52. The entire apparatus is carried on a bracket 58 mounted on the machine frame. Guide blocks 60 and 62 are mounted adjacent the feed rollers to guide the wire between the rollers. Driven roller 52 is mounted on link 64 which is pivotally mounted at 66 to bracket 58. The other end 68 of link 64 is spring biased so that the roller 52 is loaded against the roller 48. This mechanism comprises a spring 74 positioned between lug 70 and the end of the link. A threaded adjustment screw 72 passes through the lug 70 and acts on the spring 74 to control the loading of the roller 52.

After the wire passes through the feed roller it is fed into a guide housing 76. This housing has sides 78 and 80 and top and bottom portions 82 to confine the wire and is carried on the machine frame by bracket 84. The rear of the housing comprises a control vane 86 pivoted at 88 to the housing. The vane 86 contacts a pin 92 which operates a limit switch 90. The limit switch 90 controls the operation of the motor 50. Thus as the wire is fed into the housing 78, the wire will contact the vane 86 and operate the limit switch to turn off the motor 50. At this point the wire passing through straighteners 94 and by means of the feed rolls 16 will be drawn from the housing 78 and cut to length. As the wire is removed from the housing, the vane 86 will pivot—operating the limit switch and the motor 50 so that the feed rolls 46 push more wire into the housing.

Figure 3:
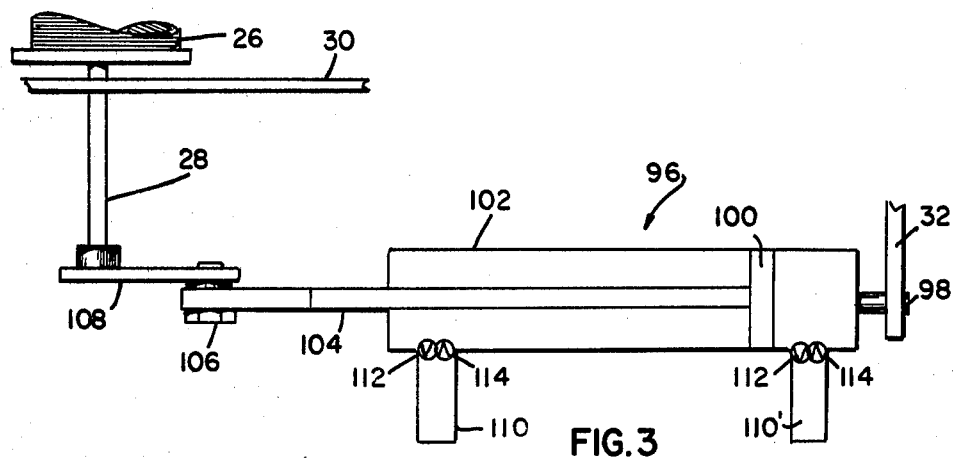
FIG. 3 is a top view of the dampener.
Figure 4:
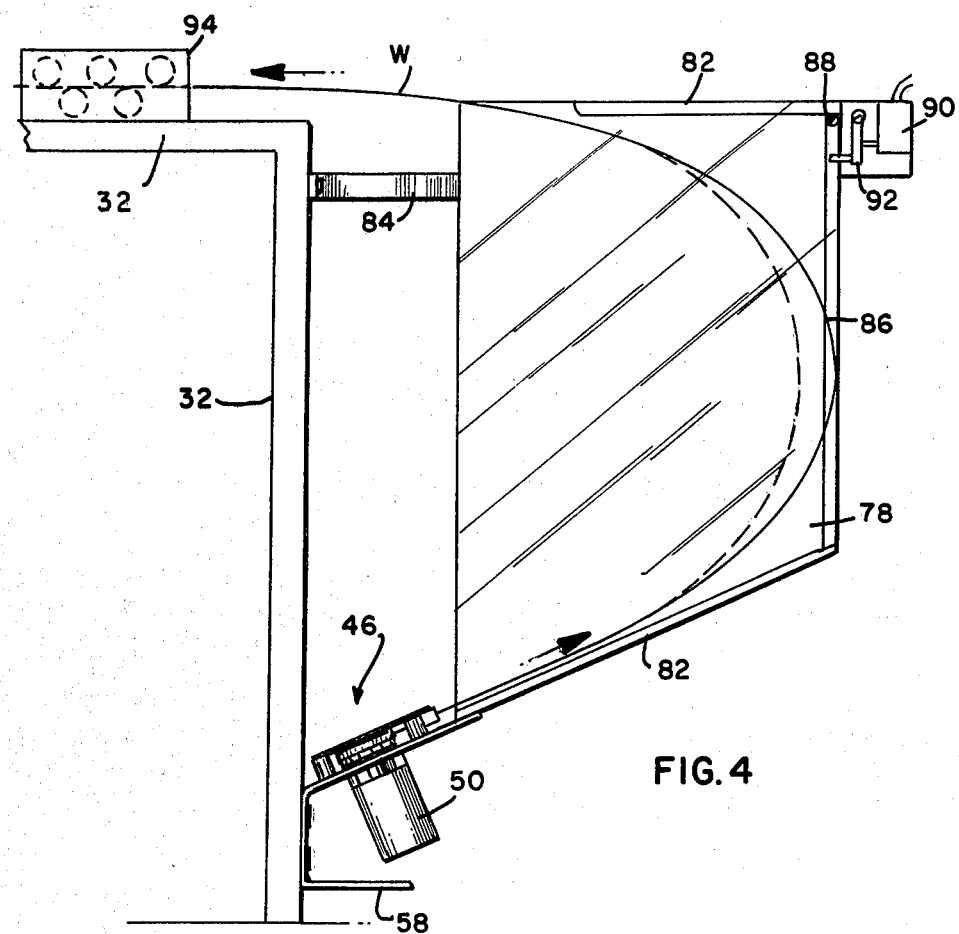
FIG. 4 is a side elevational view of the wire feed and wire control housing.
Figure 5:
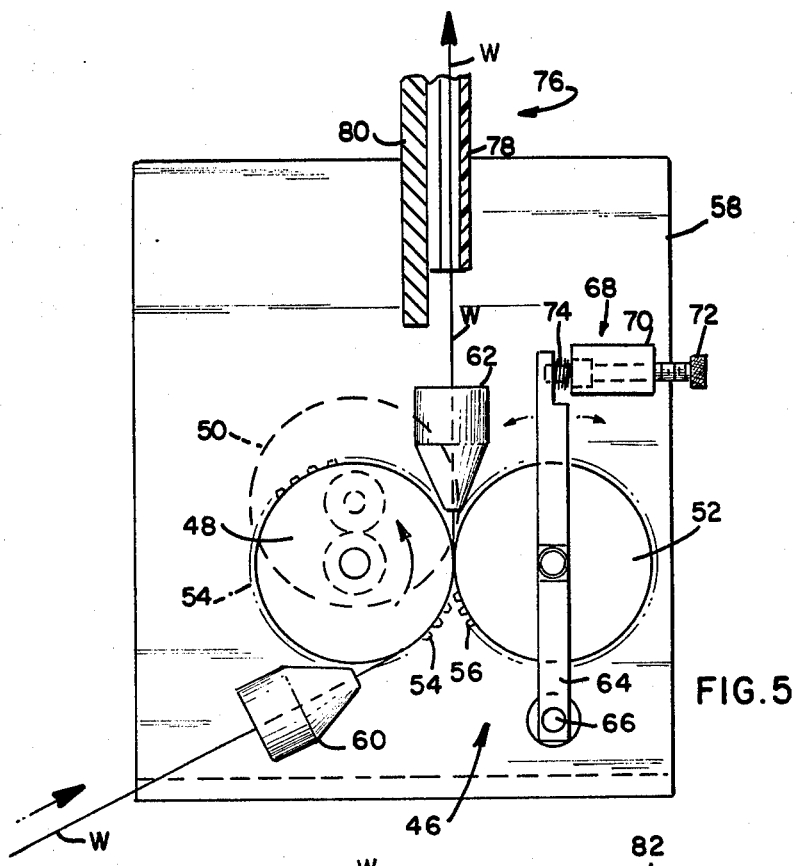
FIG. 5 is a top plan view of the feed rolls.

To further isolate the inertia build-up by the rotation of the reel, a dampener 96 is attached to the reel and pivoted on the machine frame 32 at 98. The cylinder 102 has a piston 100 with a piston rod 104 pivoted at 106 to link 108 secured on the reel shaft 28. Accumulators 110 100′ are valved out and in at 112–114 to the cylinder. The valve 112 is restricted and the valve 114 is unrestricted so that as the reel is rotated the link 108 is rotated causing the piston 100 to be moved to the left in FIG. 3 which forces air through restricted valve 112 into the accumulator 110 to dampen or brake the rotation of the reel shaft and thus dampen the inertia of the reel as it rotates. At the same time, air is drawn into the right side of cylinder 102 from accumulator 110′ through unrestricted valve 114. Further rotation of the reel will further rotate link 108 moving piston 100 to the right in FIG. 3 forcing air into accumulator 110′ through restricted valve 112 again damping the rotation of the reel. Air will at the same time be drawn in the left hand end of cylinder 102 from accumulator 110 through unrestricted valve 114.

Figure 6:
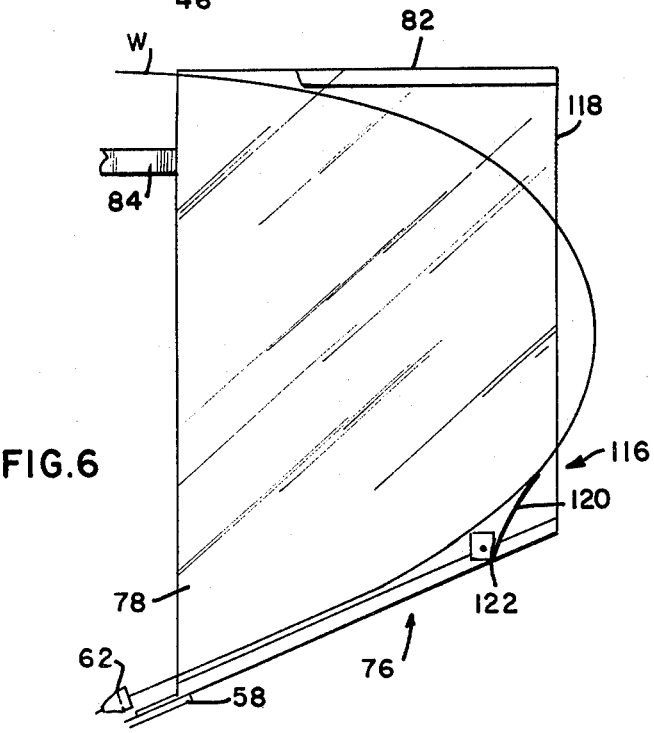
FIG. 6 is a view of an alternative embodiment of the guide housing and wire activated feed roller drive control.

Attention is now directed to FIG. 6 which illustrates an alternative embodiment 116 of the wire control in the guide housing that controls the operation of the feed roller motor. In some instances the wire being used may be of a lighter gauge and have a tendency to fold or kink when being forced against the vane 86. In that case, the back 118 of the housing is left open and flexible strip 120 controlling contacts 122 (and thus operation of motor 50) is used. When the wire contacts the flexible strip 120 and actuates the contacts 122, the operation of the motor 50 ceases. The length feed rolls 16 can then pull the wire from the housing until the wire releases from the flexible strip at which time the motor 50 is activated and additional wire is fed into the housing.

Thus, it can be seen that with the action of feed rolls 46 and by controlling the action of the wire in the guide housing, the wire is fed to the length controlling feed rolls at a constant pressure to assure that an accurate length of wire will be cut. Further, with the action of dampener 96 the inertia of the rotation of reel 26 is controlled. This would be true regardless of the size of reel or amount of wire on the reel at any one time.

We claim:

1. A wire feeder for removing wire from a reel of wire and feeding the wire to a wire length cutting station at a constant feed pressure so that a consistent length of wire can be cut from the reel including;
   a. feed means for removing the wire from the reel and a spring biased idler pulley positioned between the reel and the feed means to maintain the wire between the reel and feed means under constant tension;
   b. said feed means comprising a pair of rollers for frictionally engaging the wire and drawing the wire from the reel, a motor for driving at least one of said rollers, said rollers having inter-engaging gear teeth so that rotation of one roller by the motor causes an opposite rotation of the other roller so that the rollers can draw the wire off the reel;
   c. a guide housing adjacent said feed means to receive the wire from the said feed means to contain the wire in a predetermined configuration;
   d. said guide housing comprising opposed spaced side wall members which receive the wire and an end wall against which the wire comes in contact;
   e. said end wall being pivotally mounted to said side wall members and having means controlling a limit switch which controls the operation of the roller motor so that as wire is fed into the guide housing and contacts the end wall, the limit switch will be energized to shut off the roller motor so that additional wire will not be fed into the guide housing;
   f. means to draw the wire out of the guide housing and cut the wire to a desired length at the length cutting station so that as wire is removed from the guide housing, the wire will no longer contact the end wall so that the limit switch can again be operated to energize the roller motor causing the rollers to withdraw more wire from the reel into the guide housing so a consistent length of wire is present in the guide housing under a constant feed pressure which is isolated from the reel.

2. The wire feeder set forth in claim 1, including a rotatable shaft supporting the wire reel for rotation, a link connected to said shaft and a dampening cylinder connected to said link for dampening the inertia of rotation for the reel.

3. The wire feeder of claim 2, wherein said cylinder is an air cylinder having a piston therein, accumulators communicating with the ends of the cylinder through restricted valves so that as the piston in the cylinder is moved from end to end of the cylinder the air in the cylinder is passed into the accumulators through the restricted valves to inhibit movement of the piston to thus restrict rotation of the reel shaft to dampen the inertia of the rotation of the reel.

\* \* \* \* \*